United States Patent
Koch et al.

[11] Patent Number: 6,030,478
[45] Date of Patent: Feb. 29, 2000

[54] METHOD AND APPARATUS FOR REMOVABLY INSERTING AN ELECTRIC TIRE TAG INTO A TIRE

[75] Inventors: Russell W. Koch, Hartville; John D. Rensel, Tallmadge, both of Ohio; Paul B. Wilson, Murfreesboro, Tenn.

[73] Assignee: Bridgestone/Firestone, Inc., Akron, Ohio

[21] Appl. No.: 09/021,518

[22] Filed: Feb. 10, 1998

[51] Int. Cl.[7] .................................................. B29C 63/30
[52] U.S. Cl. ....................................... 156/123; 152/152.1
[58] Field of Search .......................... 156/123; 152/152.1

[56] References Cited

U.S. PATENT DOCUMENTS

| | | | |
|---|---|---|---|
| 3,037,575 | 6/1962 | Quinn | 152/152.1 X |
| 5,181,975 | 1/1993 | Pollack et al. | 152/152.1 |
| 5,520,231 | 5/1996 | Myatt | 152/152.1 |
| 5,562,787 | 10/1996 | Koch et al. | 152/152.1 |
| 5,573,610 | 11/1996 | Koch et al. | 152/152.1 |
| 5,573,611 | 11/1996 | Kock et al. | 152/152.1 |

FOREIGN PATENT DOCUMENTS

| | | |
|---|---|---|
| 505905 | 9/1992 | European Pat. Off. . |
| 90/12474 | 10/1990 | WIPO . |

*Primary Examiner*—Francis J. Lorin
*Attorney, Agent, or Firm*—John M. VAsuta; Michael Sand

[57] ABSTRACT

An improved method and apparatus permits the insertion and removal of an electronic monitoring device from a tire, while securing the electronic monitoring device to the tire so that stress, strain, impact, cyclic fatigue and vibration are minimized. After a rubber patch is vulcanized, the patch is permanently assembled to the inner liner of a vulcanized tire by affixing it to the tire inner liner. An electronic monitoring device, after having been encapsulated in a suitable rigid potting material to form a rigid tag, is fitted with a power source to form a tag assembly in a shape which allows for insertion into a cavity in the patch. The tag is carefully inserted into the cavity housing. The tag assembly is locked into place within the cavity using a suitable removable locking means.

8 Claims, 5 Drawing Sheets

METHOD AND APPARATUS FOR REMOVABLY INSERTING AN ELECTRIC TIRE TAG INTO A TIRE

FIELD OF THE INVENTION

This invention pertains to an apparatus and a method of inserting and removing an active tag into a compartment which is permanently attached to a tire. More particularly, this invention sets forth a method and apparatus for inserting and removing an electronic device encapsulating in a rigid material, into a compartment of a vulcanized rubber patch which is permanently attached to a vulcanized tire.

BACKGROUND OF THE INVENTION

It is desirable to monitor engineering conditions of tires, such as wear, internal pressure and internal temperature in order to reduce tire costs and maximize vehicle efficiency. Of course, it is advantageous to perform such monitoring in large truck tires, which are expensive.

Prior art methods of monitoring large truck tires have included passive integrated circuits embedded in the body of the tire, or self-powered circuits which are positioned external to the tire. The passive integrated circuits rely on inductive magnetic coupling or capacitative coupling to energize the circuit, thus providing power to the circuit from a source remote from the tire. Self-powered circuits positioned external to the tire are exposed to damage from the environment such as weather, road hazards and even vandalism.

Recent engineering advances have permitted the installation of monitoring devices having active integrated circuits within tires. One such device is described in U.S. Pat. No. 5,562,787 to Koch et al. entitled "Method of Monitoring Conditions of Vehicle Tires", incorporated herein by reference, and assigned to the assignee of the present invention. These devices include an active circuit powered by a dedicated long life, miniature battery and at least one sensor for detecting, optionally storing and transmitting real time engineering conditions within the tire. Such devices are capable of being programmed to remain in an active, but dormant condition, but will switch automatically to an "awakened" condition in response to an external signal or a condition which exceeds preset limits.

One of the problems faced with such active devices is that they are delicate electronic devices that must operate in the harsh environment of a tire. Thus it is important to secure these devices in the tires to minimize the effect of the harsh tire environment on them, while still permitting them to be exposed to this environment to allow accurate monitoring of the engineering conditions for the life of the tire. These active devices have previously been mounted in tires by first encapsulating the device or power-containing circuit in a material which forms a rigid or semi-rigid encasement about the device, thereby inhibiting straining of the device as a result of applied stresses during operation. Such materials have included non-foam compounds such as urethanes, epoxies, polyester-styrene resins, hard rubber compositions, and the like. The encapsulated device is then placed into a green rubber material which forms a housing or is placed in a green rubber pocket or pouch that becomes part of the tire. The encapsulated device is then permanently set within the rubber material during a subsequent vulcanizing operation. The encapsulated device, including the power source or battery, is then permanently assembled to the tire, so there is no way to replace the battery once it is discharged, nor is there a practical way to disassemble the encapsulated device to repair a failed component.

While the methods and apparatus of U.S. Pat. No. 5,562,787 provide an acceptable method of assembling an active chip into a tire cavity, an improved method and apparatus which permits assembly and disassembly of the encapsulated device and battery from the tire.

SUMMARY OF THE INVENTION

In accordance with the present invention, an improved method and apparatus for assembling and disassembling an active electronic monitoring device into a tire is disclosed.

The improved method and apparatus permits the insertion and removal of an electronic monitoring device from a tire, while securing the electronic monitoring device to the tire so that stress, strain, impact, cyclic fatigue and vibration are minimized. A rubber patch having a first side which includes a housing with a cavity having a preselected configuration and a second opposite side approximating the contour of an inner liner of a tire is prepared. Although the rubber patch may be assembled to the tire and vulcanized with the tire, it is much more practical to assemble the rubber patch to the tire after both the rubber patch and the tire have been vulcanized. After the rubber patch is vulcanized, the patch is permanently assembled to the inner liner of a vulcanized tire by affixing the second opposite side of the patch to the tire inner liner. The electronic monitoring device, after having been encapsulated in a suitable rigid potting material to form a rigid tag, is fitted with a power source to form a tag assembly in a shape which allows for insertion into the contour of the cavity housing which is carefully inserted into the cavity housing. The tag assembly is locked into place within the cavity using a suitable removable locking means.

An advantage of the present invention is that the tag assembly may be inserted into the tire after vulcanization of the tire and after the assembly of the patch to the tire. Because the tag assembly is locked into place using removable locking means, the tag assembly may be removed at any time during the life of the tire to replace the rigid tag or the power source. Thus, if a battery fails, it may be easily replaced so that the tag assembly can continue to operate. If the rigid tag fails because of a failure of any of the components comprising the tag, it can easily be removed or replaced.

Another advantage of the present invention is that is a tire is to be retreaded, the tag assembly may be removed from the tire during the vulcanizing operation and replaced after completion of the vulcanizing operation, so that the sensitive and delicate electronic circuitry of the rigid tag and the batter are not subjected to the harsh environment of the vulcanizing operation, which could destroy or adversely affect its life.

Since the tag assembly is removable for repair or replacement, a further advantage is that, in the event of a failure of the battery or any component of the rigid tag, it is not necessary to assemble a second patch assembly to the tire.

BRIEF DESCRIPTION OF THE DRAWINGS

The subject matter which is regarded as the invention is particularly pointed out and distinctly claimed in the concluding portion of the specification. The invention itself, however, both as to its organization and its method of practice, together with further objects and advantages thereof, may best be understood by the following description taken in conjunction with the accompanying drawings, in which:

DETAILED DESCRIPTION OF THE PREFERRED EMBODIMENTS

Embodiments of the present invention will be described below with reference to the drawings.

Figure 1:
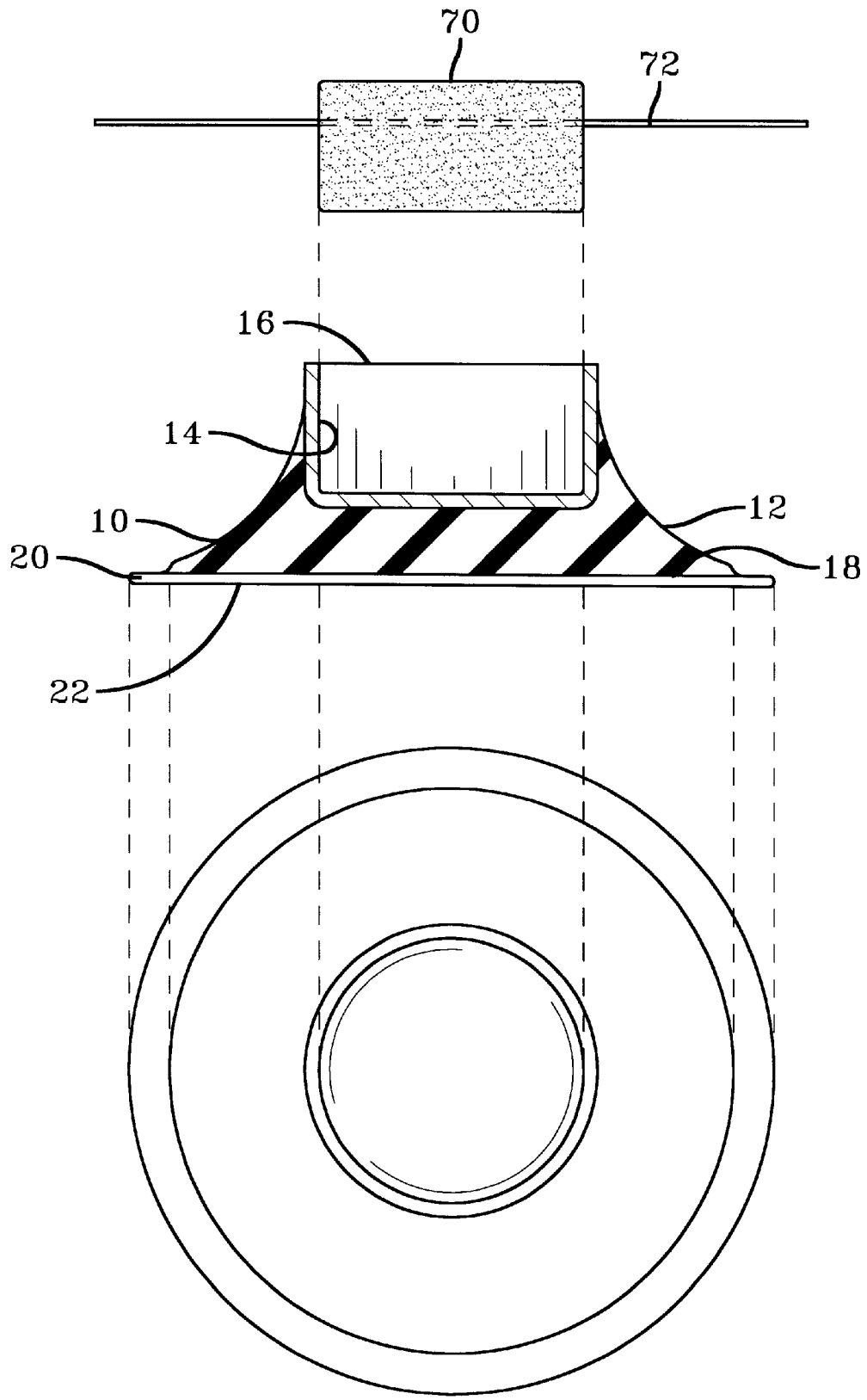
FIG. 1 is a cross-sectional view of the rubber patch of the present invention showing the housing and cavity for the tag assembly.

FIG. 1 shows a rubber patch 10 of the present invention. The patch 10 has a first side 12 which includes a housing 14 with a cavity 16 of a preselected configuration. As shown in FIG. 1, the housing 14 has a cavity 16 which is cylindrical, although the cavity 16 may be of any convenient configuration, as will become apparent from the description which follows. The patch has a second opposite side 18 approximating the contour of an inner liner of a tire (not shown). In a preferred embodiment, the rubber patch is vulcanized and then assembled to the vulcanized tire. Although any method for assembling the vulcanized rubber patch to the vulcanized tire, one acceptable and preferred method is set forth in U.S. patent application No. Ser. 08/932,091 filed Sep. 17, 1997, entitled "METHOD AND APPARATUS FOR BONDING AN ACTIVE TAG TO A PATCH AND TIRE", assigned to the assignee of the present application and incorporated herein by reference. In accordance with the referenced application, the patch may be a rubber selected from the group consisting of Ethylene Propylene Diene Monomer (EPDM) rubber, butyl rubber, natural rubber, neoprene and mixtures thereof. One preferred embodiment is a mixture of chlorobutyl rubber and natural rubber. Another preferred embodiment is a mixture of Styrene-Butadiene rubber (SBR) and natural rubber. Typically, patches made of these rubber compositions may be cured by heating to a temperature of about 150° C. and holding at this temperature for about 30 minutes. The time and temperature may be modified as necessary to achieve sufficient curing of the patch for further assembly. The second side of the patch 18 approximates the contour of an inner liner of a tire. The contour of the second side 18 preferably is radiused to have about the same radius as the tire to which it is assembled, the radius being larger for larger tires. For very large tires, such as for off-the-road tires, the radius may be eliminated altogether, so that there is no contour and the opposite side is flat, having no contour.

Affixed to the second side 18 of the vulcanized tire patch is a dual cure bonding layer 20, which has a first side (not shown) and a second side 22. This dual cure bonding layer may be assembled to the patch at any time following vulcanization of the patch and prior to assembly of the patch assembly to the tire inner liner. The dual cure bonding layer is permanently assembled to the patch to form patch assembly 60. A non-curing cement (not shown) is applied to side 18 of the patch in order to hold the dual cure bonding layer 20 onto the patch. The non-curing cement and the dual cure bonding layer are products of Patch Rubber Company. The important feature of the dual cure bonding layer is that it can be chemically activated and cured, without the need for heating to an elevated temperature. The process is diffusion controlled, however, and some minimal heating will speed the curing process. The dual cure bonding layer may be any material which can be activated and cured to the vulcanized rubber of the tire inner liner and the vulcanized patch. Preferably, however, the dual cure bonding rubber is natural rubber. The dual cure bonding rubber, after application of the activating cement, may cure at room temperature over a period of seventy two (72) hours. However, if more rapid curing is desired. this may be accomplished by heating to 45° C. for at least twenty four hours.

Figure 2:
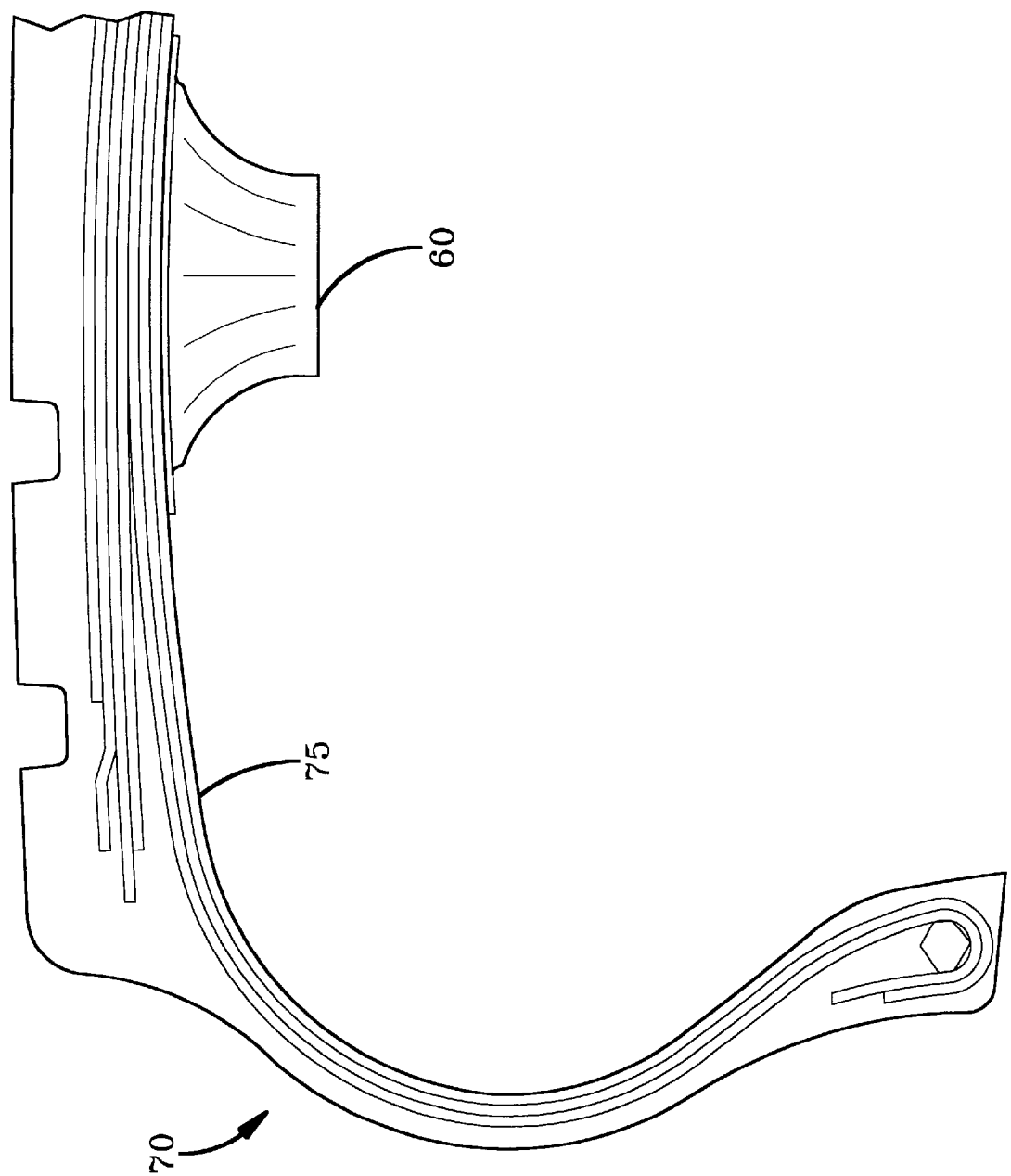
FIG. 2 is a cross-sectional view of the rubber patch of the present invention attached to the inner liner of a tire.

Referring now to FIG. 2, patch assembly 60 is then assembled to the inner liner 75 of tire 70. Activating cement is first applied to second side 22 of dual cure bonding layer 20. The patch assembly is then stitched to the inner liner of the vulcanized tire and the patch assembly/tire assembly is allowed to cure for a sufficient time and temperature to form a strong bond between the tire and the patch assembly. The times and temperatures utilized for this curing may be basically the same times and temperatures as previously discussed. To ensure a strong bond, the patch assembly optionally may be clamped to the tire inner liner 75, until the curing cycle is completed.

Figure 3:
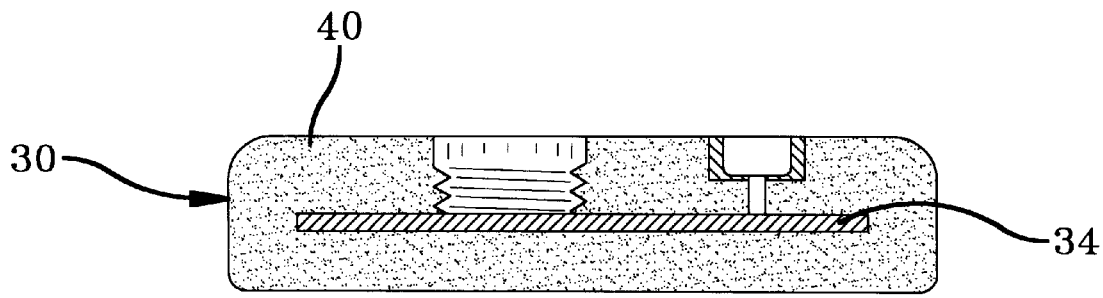
FIG. 3 is a cross sectional view of the electronic monitoring device embedded in potting material.
Figure 4:
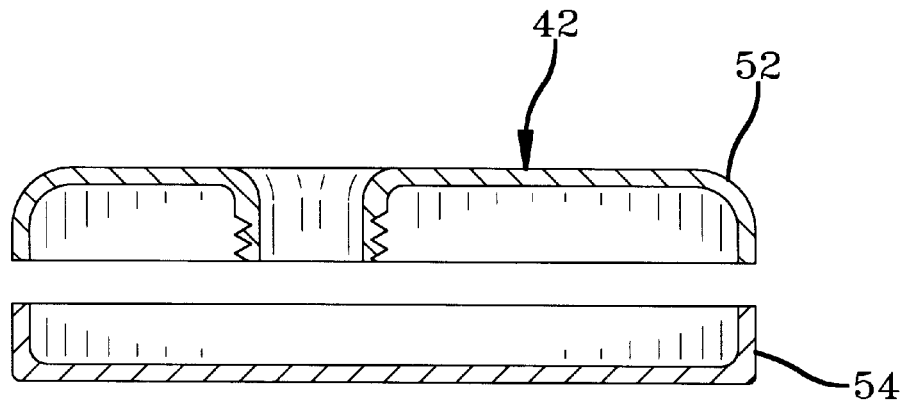
FIG. 4 is a cross-sectional view of the mold used to embed the electronic monitoring device in the potting material.
Figure 5:
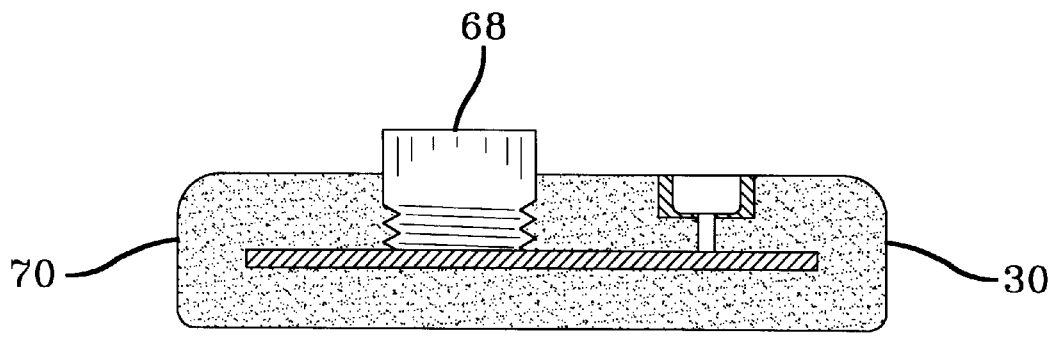
FIG. 5 is a cross sectional view showing a battery attached to the tag; forming a tag assembly.

The electronic monitoring device is a circuit board which includes sensors and optional an antenna. The electronic monitoring device may include a power source or battery, although the battery may be attached to the electronic monitoring device at a later time. In the preferred embodiment, the battery is not included as part of the electronic monitoring device. The electronic monitoring device 34 is encapsulated in a potting material 40 which solidifies into a rigid material as shown in FIG. 3. Referring to FIGS. 3 and 4, the electronic monitoring device 34 is placed within a mold 40 having a first half 52 and a second half 54. The mold is then filled with the potting material 40 in fluid form, which fills the mold and flows around the electronic monitoring device and allowed to cure, resulting in a rigid tag. Any potting material having a Young's Modulus of at least 30,000 psi and which is capable of being molded around the electronic monitoring device without damaging any of the components of the device. Preferably, the potting material has a Young's Modulus of at least about 100,000 psi. Two preferred potting materials include epoxy and urethane. If desired, the curing of the potting material around the electronic device may be accelerated by preheating the mold to an elevated temperature which is above ambient, but below the temperature at which damage to the electronic monitoring device will occur. A preferred temperature is about 80° C. After the epoxy has been cured, the mold halves 52, 54 are separated, yielding a rigid, encapsulated tag 30. In a preferred embodiment, FIG. 5, a battery 68 which provides power to the tag 30 is attached to the tag to form a tag assembly 70. Although the battery is shown as held in position contacting the electronic monitoring device 34 by threading, any suitable means of attaching the battery to the circuit board so that the battery may be removed is acceptable. Alternate means of attaching the battery to the circuit board may include spring clips, lock pins or other hold down devices.

Figure 6:
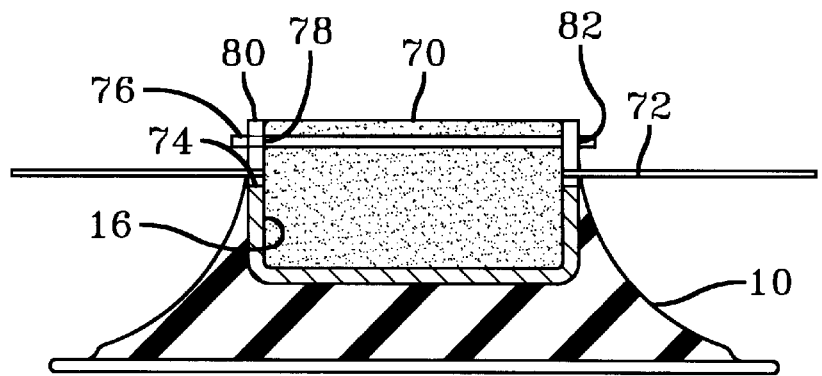
FIG. 6 is a cross-sectional view of the tag assembly assembled inside the cavity of the tire patch, with a locking device holding the tag assembly in place, before crimping of the locking device.

The tag assembly 70 may be of any configuration which allows it to fit within the contour of the cavity 16, both of which are cylindrical in the embodiment shown in FIG. 1. In the preferred embodiment, tag assembly 70 is assembled into the cavity 16 as shown in FIG. 6. Since the rubber patch assembly can be attached to the tire using an air cure or low temperature cure, it is understood that the sequence of assembling the tag assembly into the rubber patch housing may be accomplished either before or after the rubber patch is attached to the tire inner liner. Tag assembly includes an optional antenna 72. Housing 14 includes slots 74 to receive the antenna. After the tag assembly 70 is in place within the cavity, at least one lock pin 76 is inserted through a first aperture 78 in housing 80. As shown in FIG. 6, lock pin 76 is positioned across at least a portion of the top of tag assembly 70, preferably through a second aperture 82 on the opposite side of the housing. Alternatively, lock pin 76 could extend into the potting of tag assembly 70.

The positioning of the lock pin is not critical, so long as lock pin 78 positively secures tag assembly 70 into position within cavity 16 and prevents tag assembly 70 from moving. After insertion through the housing 14, the lock pin 76 is deformed so that it will not back out of the apertures. Tag assembly 70 may then be removed from the housing by simply drilling lock pin 76 out of aperture 78.

Many different methods of positively locking the tag assembly can be accomplished. By way of illustration of equivalent locking techniques, instead of a locking pin, a self-tapping screw may be inserted through aperture 78 and screwed into position within the potting.

Figure 7:
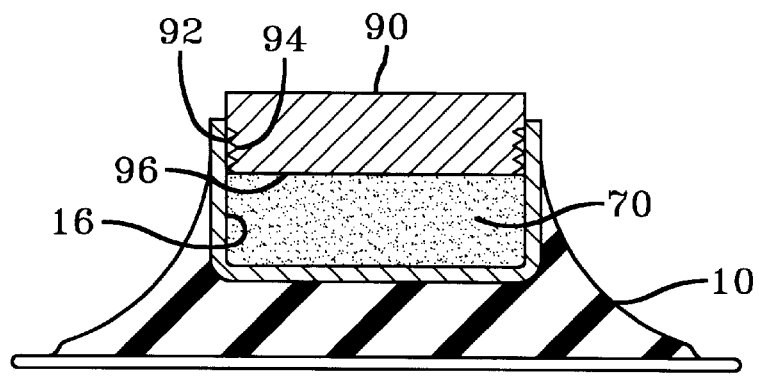
FIG. 7 is a second embodiment of the present invention depicting a cross-sectional view of the tag assembly being locked inside the cavity of the tire patch with a threaded insert.

In a second embodiment of the present invention, illustrated in FIG. 7, tag assembly 70 has a profile corresponding to that of cavity 16. Tag assembly is assembled into the bottom of cavity 16. Housing 14 extends above tag assembly 70 after it has been assembled into cavity 16. Insert 90, also having a profile corresponding to cavity 16 is the inserted into the housing until the bottom 96 of insert 90 contacts the top of tag assembly 70, thus securing it in place. Insert 90 is then locked in place. This may be accomplished by any convenient method, such as by extending a locking pin through insert 90 and deforming it, or by utilizing locking tabs to secure insert 90 to patch assembly 10. However, in the preferred embodiment shown in FIG. 7, insert 90 includes external threads 94 which correspond to internal threads 92 formed in housing 14. Insert 90 is screwed into housing 14 until the insert bottom 96 contacts the top of tag assembly 70. Of course, regardless of the method used to secure tag assembly 70 in place in cavity 16, tag assembly is readily removable for battery replacement or replacement of the entire assembly 70 by removing insert 90 from housing 14. It is obvious that tag assembly 70 may be reinserted after accomplishing repair or replacement, or after retreading of the tire by simply replacing insert 90 over the reassembled tag assembly and locking insert 90 in place as discussed above.

Figure 8:
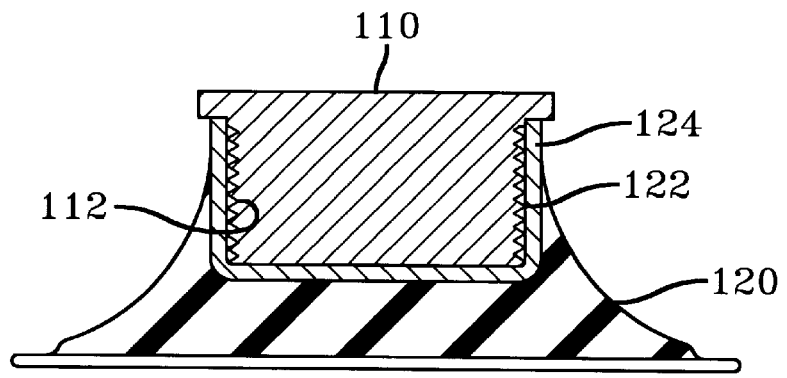
FIG. 8 is a third embodiment of the present invention showing a threaded tag assembly threaded into the cavity of the rubber patch housing.

In a third embodiment of the present invention, FIG. 8, a tag assembly 110 including the components previously discussed, is formed with external threads 112 in the potting. Rubber patch assembly 120, also similar to rubber patches previously discussed, includes internal threads 122 formed in housing 124 which mate with the external threads 112 of tag assembly. Tag assembly 110 is assembled into rubber patch assembly 120 by simply screwing tag assembly 110 into housing 124. While this arrangement normally should be sufficient to lock tag assembly to rubber patch assembly, an optional locking pin or set screw may be added to the assembly to lock the internal and external threads in place and prevent tag assembly from backing out of the housing of rubber patch assembly 120.

From the foregoing, other embodiments should be obvious. For example, a slot and spline arrangement not shown may be used to lock the tag assembly into the housing. Mating slots and splines are formed in the potting of the tag assembly and in the housing. After placing the tag assembly into the housing, an optional locking device as previously discussed may be used to prevent the tag assembly from backing out of the housing.

Figure 9:
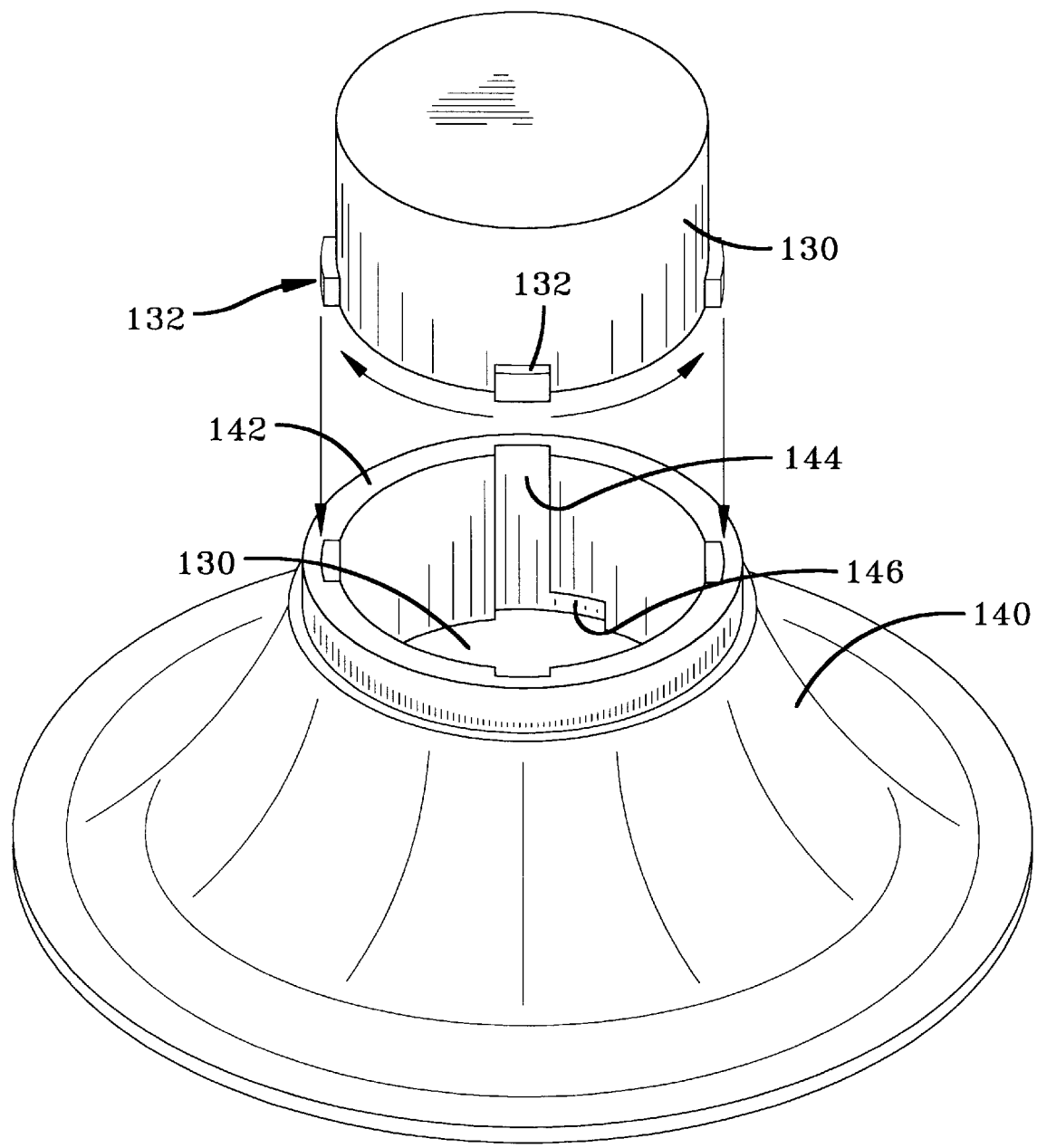
FIG. 9 is a fourth embodiment of the present invention, shown in perspective, showing a slot and tab arrangement for locking a tag assembly to a rubber patch housing.

In yet another embodiment, depicted in FIG. 9, tag assembly 130 is formed with at least one tab 132, while housing 142 of rubber patch 140 is formed with slots 144 corresponding to tabs on tag assembly 130. At the bottom of the slots is a ring 146 having an internal diameter corresponding to the slot depth on the housing and extending from each slot at least partially around the housing bottom. Once tabs 132 of tag assembly 130 are mated with slots 144 of rubber patch and tag assembly 130 is inserted into housing 142, tag assembly 130 is rotated sufficiently so that tabs 132 are rotated into ring 146 and no longer are aligned with slots 144, locking the tag assembly to rubber patch 140. An optional locking mechanism, such as discussed previously, may be added to lock tag assembly 130 to rubber patch 140 if there is a concern about rotation of tag assembly 130 with respect to rubber patch assembly. Another method of locking tag assembly 130 to rubber patch 140 is to insert a piece of material (not shown) into at least one slot 144, for example by an interference fit between the slot and the material, so that in the event of rotation of the parts with respect to one another, even if the tabs 132 and slots become aligned, tabs 132 are prevented from moving axially in the slot. It is obvious that an equivalent structure can be achieved by reversing the arrangement of slots 144, ring 146 and tabs 132 between tab assembly 130 and housing 142. In this arrangement, at least one tab is formed in the housing and at least one slot corresponding to tabs is formed in tab assembly.

While in accordance with the patent statutes, the best mode and preferred embodiment has been set forth above, the scope of the invention is not limited thereto, but rather by the scope of the attached claims.

What is claimed is:

1. A tire having an electronic monitoring device for monitoring at least one engineering condition of a tire and mounted within the tire, comprising:

a tire having an inner liner;

a separate rubber patch having a first side which includes a housing with a cavity having a preselected configuration and a second opposite side approximating the contour of the tire inner liner, the patch being permanently assembled to the tire by attaching the second side to the tire inner liner;

a tag assembly which includes an electronic monitoring device encapsulated in a rigid potting material and a removable power source, the tag assembly having a shape permitting insertion into the housing cavity of the rubber patch; and means for removably attaching the tag assembly into place within the housing cavity.

2. A tire having an electronic monitoring device for monitoring at least one engineering condition of a tire and mounted within the tire, comprising:

a vulcanized tire having an inner liner;

a separate vulcanized rubber patch of preselected configuration having edges, a first side including a housing having a cylindrical inner surface at least a portion of which is internally threaded, and a second opposite side approximating the contour of the inner liner of the tire, the second opposite side attached to the tire inner liner; and a tag assembly including a rigid potting material encapsulating an electronic module and a battery for providing power, the tag assembly having an outer cylindrical surface corresponding to the cylindrical inner surface of the patch housing, the outer cylindrical surface having sufficient external threads which thread into the internally threaded cylindrical inner surface of the patch housing to removably position the tag assembly in relationship to the patch housing.

3. A tire having an electronic monitoring device for monitoring at least one engineering condition of a tire and mounted within the tire, comprising:

a vulcanized tire having an inner liner;

a vulcanized rubber patch of preselected configuration having edges, a first side including a housing having a cylindrical inner surface at least a portion of which is internally threaded, and a second opposite side approximating the contour of the inner liner of the tire, the second opposite side attached to the tire inner liner;

a tag assembly including a rigid potting material encapsulating an electronic module and a battery for providing power, the tag assembly having an outer cylindrical surface with an outer diameter slightly less than the inner diameter of the cylindrical inner surface of the patch housing so that the tag assembly may be inserted into the housing while having radial movement within the housing restricted; and an insert which screws into the cylindrical inner surface of the patch housing to secure the tag assembly and restrict axial movement of the tag assembly within the housing.

4. A tire having an electronic monitoring device for monitoring at least one engineering condition of a tire and mounted within the tire, comprising:

a vulcanized tire having an inner liner;

a vulcanized rubber patch of preselected configuration having edges, a first side including a housing having a cylindrical inner surface and a second opposite side approximating the contour of the inner liner of the tire, the second opposite side attached to the tire inner liner;

a tag assembly including a rigid potting material encapsulating an electronic module and a battery for providing power, the tag assembly having an outer cylindrical surface with an outer diameter slightly less than the inner diameter of the cylindrical inner surface of the patch housing so that the tag assembly may be inserted into the housing while having radial movement within the housing restricted;

an insert which assembles into the cylindrical inner surface of the patch housing over the tag assembly to secure the tag assembly and restrict axial movement of the tag assembly within the housing; and means for securing the insert in place within the housing.

5. A tire having an electronic monitoring device for monitoring at least one engineering condition of the tire and mounted within the tire, comprising:

a vulcanized tire having an inner liner;

a vulcanized rubber patch of preselected configuration having edges, a first side including a housing having a preselected configuration with preselected dimensions forming an internal cavity, and a second opposite side approximating the contour of the inner liner of the tire, the second opposite side attached to the tire inner liner;

a tag assembly including a rigid potting material encapsulating an electronic module and a battery for providing power, the tag assembly having an outer surface with dimensions slightly less than the inner dimensions of the inner surface of the patch housing so that the tag assembly may be inserted into the housing while having movement within the housing restricted; and an insert which is assembled into the patch housing and over the tag assembly to secure the tag assembly and restrict axial movement of the tag assembly within the housing.

6. The tire of claim 5 further including a removable locking means to lock the insert in position over the tag assembly, thereby preventing axial movement of the tag assembly.

7. A tire having an electronic monitoring device for monitoring at least one engineering condition of the tire and mounted within the tire, comprising:

a vulcanized tire having an inner liner;

a vulcanized rubber patch of preselected configuration having edges, a first side including a housing having a cylindrical inner surface with at least one axial slot and a recessed ring having a predetermined depth positioned circumferentially within the inner surface and intersecting the slot, and a second opposite side approximating the contour of the inner liner of the tire, the second opposite side attached to the tire inner liner;

a tag assembly including a rigid potting material encapsulating an electronic module and a battery for providing power, the tag assembly having at least one axial tab which is inserted into the axial slot of the housing and rotated radially out of alignment with the slot within the recessed ring of predetermined depth, the tag assembly having an outer diameter less than the cylindrical inner diameter of the patch housing so that the tag assembly may be inserted into the housing while having radial movement within the housing restricted; and an insert which screws into the cylindrical inner surface of the patch housing to secure the tag assembly and restrict axial movement of the tag assembly within the housing.

8. A tire having an electronic monitoring device for monitoring at least one engineering condition of the tire and mounted within the tire, comprising;

a vulcanized tire having an inner liner;

a vulcanized rubber patch of preselected configuration having edges, a first side including a housing having a preselected configuration with preselected inner dimensions forming an internal cavity, and a second opposite side approximating the contour of the inner liner of the tire, the second opposite side attached to the tire inner liner;

a tag assembly including a rigid potting material encapsulating an electronic module and a battery for providing power, the tag assembly having an outer surface with dimensions slightly less than the inner dimensions of the inner surface of the patch housing so that the tag assembly may be inserted into the housing while having movement within the housing restricted; and a removable locking means to lock the tag assembly within the internal cavity of the housing.

* * * * *